US006948120B1

(12) United States Patent
Delgobbo et al.

(10) Patent No.: US 6,948,120 B1
(45) Date of Patent: Sep. 20, 2005

(54) COMPUTER-IMPLEMENTED SYSTEM AND METHOD FOR HOSTING DESIGN-TIME CONTROLS

(75) Inventors: Vincent C. Delgobbo, Durham, NC (US); John P. Leveille, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 993 days.

(21) Appl. No.: 09/712,099

(22) Filed: Nov. 14, 2000

(51) Int. Cl.$^7$ .............................. G06F 15/00

(52) U.S. Cl. ...................... 715/530; 715/762; 709/203; 717/105; 717/115

(58) Field of Search .............................. 715/530, 501.1, 715/513, 762; 717/100, 106, 107, 105, 115, 717/116; 709/201, 203

(56) References Cited

U.S. PATENT DOCUMENTS

| | | | | |
|---|---|---|---|---|
| 6,035,119 A | * | 3/2000 | Massena et al. | 717/100 |
| 6,263,492 B1 | * | 7/2001 | Fraley et al. | 717/107 |
| 6,625,803 B1 | * | 9/2003 | Massena et al. | 717/100 |
| 6,714,219 B2 | * | 3/2004 | Lindhorst et al. | 345/769 |
| 6,714,928 B1 | * | 3/2004 | Calow | 707/4 |

OTHER PUBLICATIONS

Chris Kinsiman, "Create Design-Time Controls for the Web", Visual Basic Programmer's Journal, pp. 34-39, Oct., 1997.*
Peter Vogel, " Create Design-Time Controls with VB", VBPJ Windows NT Enterprise Development. pp. 98-100, 1998.*
Matthew B. Butler, "Supercharge VB's Forms With ActiveX", Visual Basic Programmer's Journal on-line, 1999.*

* cited by examiner

Primary Examiner—Joseph Feild
Assistant Examiner—Maikhanh Nguyen
(74) Attorney, Agent, or Firm—Jones Day

(57) ABSTRACT

A computer-implemented system and method that allows Design-Time Control components to be hosted in applications whose extensibility interfaces do not natively support Design-Time Controls. The system and method host and encapsulate a Design-Time Control while simultaneously conforming to the unique extensibility interface of the software application. The user is allowed to interact directly with the Design-Time Control. The property settings of the control are saved along with some generated content into the digital document by the application's extensibility interface. The method and system allow for repeated editing of the document by recreating a control whose property values match the property values of the control that was previously created in the document.

41 Claims, 12 Drawing Sheets

COMPUTER-IMPLEMENTED SYSTEM AND METHOD FOR HOSTING DESIGN-TIME CONTROLS

BACKGROUND

1. Technical Field

The present invention is directed to the field of computer-human interfaces. More specifically, the present invention is directed to computer-human interface design applications.

2. Description of Related Art

Businesses store information in many different formats. For example, documentary information may be stored in a word-processing document and accounting information may be stored in a spreadsheet document. In order to create digital documents such as these, one would typically use a software application. Software companies have developed applications or tools to generate these documents and those tools fall into three main classes: (1) Electronic Publishing Applications, (2) Web Content Creation Applications and (3) Web Application Development Environments.

An example of an Electronic Publishing software application is Microsoft Word, available from Microsoft Corporation, Redmond, Wash. that creates a Rich Text Format (RTF) document and other formats. This application can construct digital documents containing various content types. An example of a Web Content Creation Application is Macromedia Dreamweaver, available from Macromedia, San Francisco, Calif. that creates a Hypertext Markup Language (HTML) document. This application can construct digital documents containing various content types. An example of a Web Application Development Environment is Macromedia Dreamweaver UltraDev, available from Macromedia, San Francisco, Calif. that creates a Web application. This application can construct digital documents containing various content types and active Web content.

Sometimes, a user may wish to implement functionality that is not supported by a particular software application. Many software applications allow the user to extend the application to address individual user needs or enable functionality unforeseen at the time the application was developed. For example, Microsoft's Front Page application allows a user to insert a Design-Time Control in a HTML document. Design-Time Controls (which are available from Microsoft Corporation have been created to assist the user in authoring web content by automatically generating HTML text and/or computer-executable code. For example, a "checkbox" Design-Time Control may be inserted into a Web page document during its creation. The graphic representation of the checkbox control is displayed so that the user can more easily integrate the functionality of the checkbox control with the rest of the Web page document. The user can select the graphic representation in order to edit the checkbox's properties, such as to change the size or label properties of the checkbox. The checkbox Design-Time Control generates HTML text code (or other computer-executable code) that corresponds to the properties set by the user. In this way, an extensibility interface such as Design-Time Controls allows for the enhancement of the application with plug-in components that assist the user in digital document and active content creation.

An advantage of extensible applications and clearly defined extensibility interfaces is that different software vendors can create components that plug into the same software application. This is a great benefit to the user because he/she benefits from a synergistic effect among software components from various vendors. From the perspective of the component vendor, a significant stumbling block exists. Many of these extensible software applications have different extensibility interfaces. This means that a single implementation of a software vendor's plug-in components will not function with all extensible applications. For example, if a vendor creates a checkbox Design-Time Control, it will function in Microsoft Front Page and SoftQuad HoTMetaL Pro because they both support the Design-Time Control's extensibility interface. But this same checkbox Design-Time Control will not function in Macromedia Dreamweaver. The end result is that software component developers cannot develop efficiently because they have to create a different version of their components for each unique extensibility interface.

SUMMARY

The present invention overcomes the aforementioned problems as well as other problems by providing a computer-implemented system and method that allows Design-Time Control components to be hosted in applications whose extensibility interfaces do not natively support Design-Time Controls. The invention hosts and encapsulates a Design-Time Control while simultaneously conforming to the unique extensibility interface of the software application. The invention allows the user to interact directly with the Design-Time Control. It then saves the property settings of the control along with some generated content into the digital document by the application's extensibility interface. The method and system allow for repeated editing of the document by recreating a control whose property values match the property values of the control that was previously created in the document.

DETAILED DESCRIPTION OF THE PREFERRED EMBODIMENT

Figure 1:
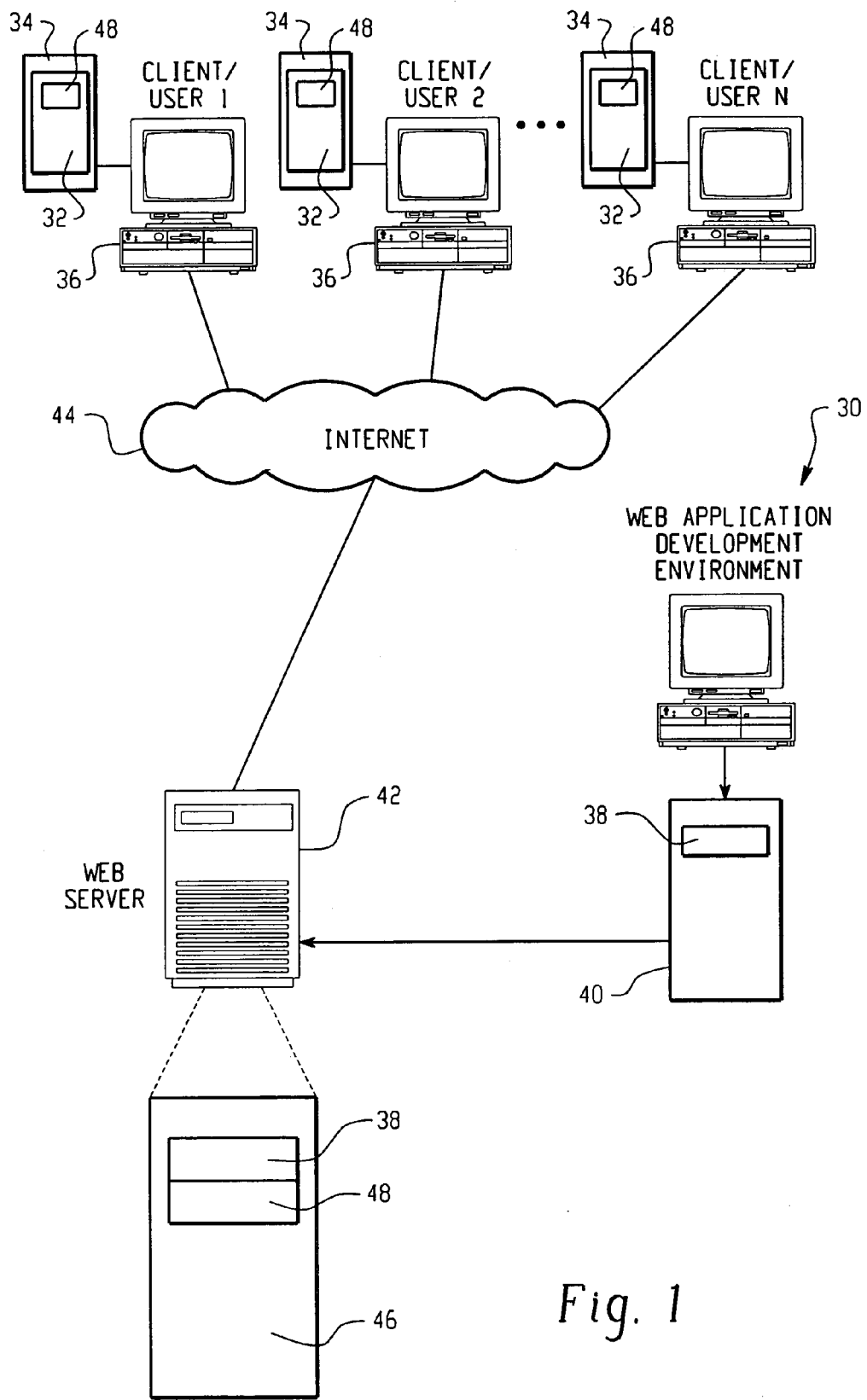
FIG. 1 is a system diagram depicting a Web page design environment.

With reference to the drawings, FIG. 1 is a system diagram showing the environment within which the present invention operates. A Web page design environment as generally shown at 30 creates Web pages (such as Web page 32) for display on browsers 34 of client computers 36. The Web page design environment 30 allows programmers to design Web page 32 using controls such as Design-Time Controls 38.

During the design of a Web page 40, a programmer may wish to edit the properties of a Design-Time Control 38. For example, the programmer may edit the size properties of a control to shrink the control to fit better within the Web page document. After Web page 40 has been designed and includes control 38, the Web page 40 is stored on Web server 42 for access by the users 36 through a global communications network, such as the Internet 44. It should be understood that any type of network may be used, such as a local area network, a wide area network, or a global network.

The stored Web page 46 contains both the Design-Time Control 38 and the run-time text 48. Once users 36 retrieve the stored Web page 46, the run-time text 48 is active as it is executed upon the client computers 36. Before the Web page is returned from the Web server, the run-time text may also be executed on the Web server.

The present invention includes generation of the run-time text 48 when the Web page 40 is saved as well as during other situations, such as when the control 38 is inserted into the Web document 40. The Design-Time Control 38 may be any control capable of generating text or computer-executable code. The Design-Time Control 38 may be placed within an HTML comment to render the design-time information of the control invisible at run-time to the run-time client process or may be removed before the document is sent to the client.

Figure 2A:
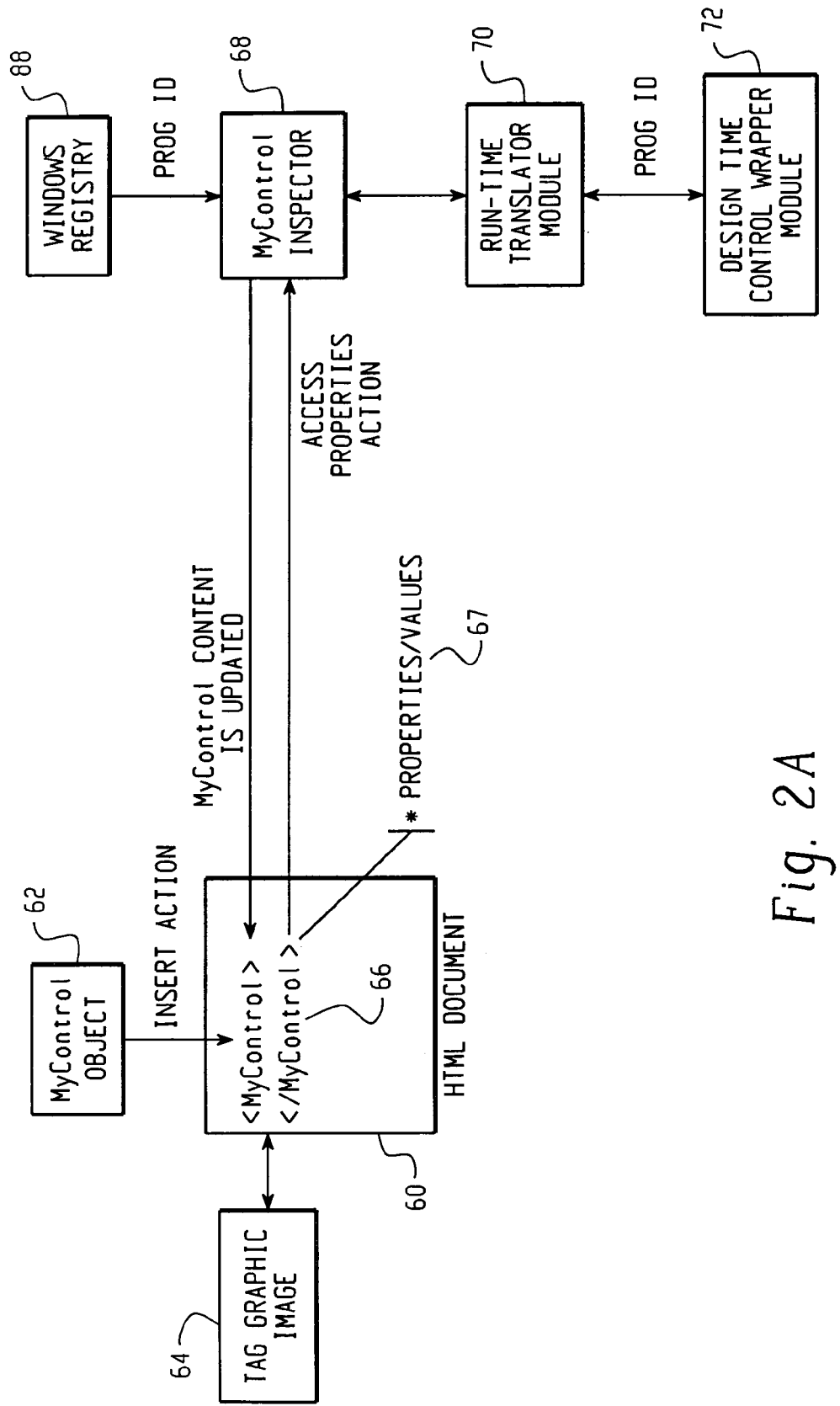
FIGS. 2A and 2B are structure diagrams depicting the module structure and data flow of the present invention for handling Design-Time Controls.
Figure 2B:
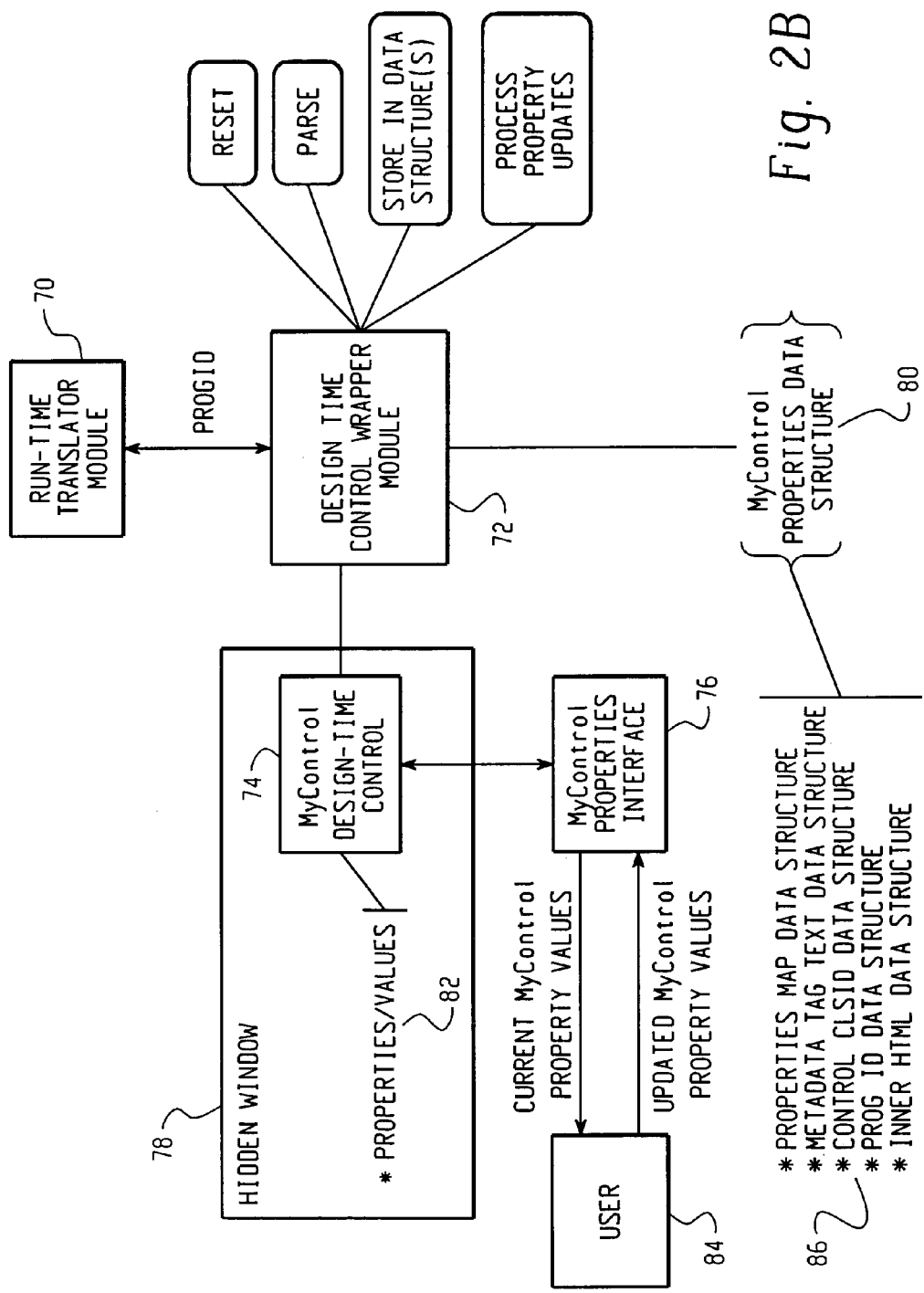

FIGS. 2A and 2B are block diagrams depicting the module structure and data flow of the present invention. Design-Time Controls are placed in an HTML document 60 created via an application such as the Dreamweaver Web page design application. A custom HTML tag is created by inserting the corresponding object. In this example, the tag 66 and object 62 are named "MyControl". The MyControl object 62 includes an HTML file (not shown) and a graphic image 64. In addition, there is a MyControl inspector 68 that is used within the Dreamweaver application to manage the MyControl object 62 and tag 66. The inspector 68 includes another HTML file (not shown). These files are placed in the Dreamweaver configuration directory and an existing Dreamweaver file is modified to make the application aware of the new custom tag.

In this example the custom tag 66 appears as:
"<MYCONTROL></MYCONTROL>."

Once the custom tag 66 has been defined and the files that define the MyControl object 62 and its inspector 68 are established, an insert action via the Dreamweaver user interface inserts a new MyControl object 62 into document 60. When the control is inserted, a graphic image 64 is placed in the document 60, and the Dreamweaver application inserts the empty HTML MyControl tag 66 for the MyControl object 62.

Next the user clicks with the mouse on the graphic image 64 to access the properties of the MyControl object 62. At this point the MyControl inspector 68 is activated by the Dreamweaver application. The MyControl inspector 68 activates the present invention which in turn creates a MyControl Design-Time Control 74. A properties interface window 76 is created for the MyControl Design-Time Control 74 so that the user may edit the Design-Time Control's properties 82. Once the property editing session has completed, the present invention provides the edited properties to the MyControl inspector 68 for updating the properties 67 of the MyControl tag 66 in the HTML document 60.

More specifically, the present invention is disposed between the point where the user takes action to access the properties and the point where the content is replaced. The present invention includes a run-time translator module 70 and a Design-Time Control wrapper module 72. The run-time translator module 70 is a software library that functions within a Microsoft Windows operating system environment. It complies with the specifications of the C-Level Extensibility chapter of the Extending Dreamweaver 3, published by Macromedia located in San Francisco, Calif. The run-time translator module 70 acts as a "bridge" to exchange calls and other data between the inspector 68 and the Design-Time Control wrapper module 72. The present invention's Design-Time Control wrapper module 72 encapsulates a Design-Time Control.

When a Design-Time Control is created in a document, the inspector 68 provides the run-time translator module 70 with an instruction to reset the Design-Time Control wrapper module 72. This call is passed on to the Design-Time Control wrapper module 72. If the Design-Time Control wrapper module 72 is currently storing the state of a Design-Time Control 74 it discards this data.

If the MyControl tag 66 in the document 60 contains no content then the inspector 68 instructs the run-time translator module 70 to set the ProgID of the Design-Time Control 74. This typically happens the first time the inspector 68 is invoked for a particular tag in the document. Since each tag is inserted empty, the first time the inspector 68 examines the tag 66 there is no content to parse. For this reason the Design-Time Control wrapper module 72 uses a ProgID to indicate what type of Design-Time Control to create. The inspector 68 instructs the run-time translator module 70 to set the ProgID, and the ProgID is passed in. The run-time translator module 70 passes the ProgID on to the Design-Time Control wrapper module 72. The Design-Time Control wrapper module 72 creates a hidden window 78 and creates a new Design-Time Control 74 in this window. The type of Design-Time Control 74 that is created is based on the ProgID passed.

If the MyControl tag 66 in the document 60 contains at least some property data then the set ProgID instruction is not performed. Instead, the inspector 68 copies the content from the MyControl tag 66 in the document 60 and sends it to the run-time translator module 70. The inspector 68 instructs the run-time translator module 70 to parse the content that is passed in. In this example, the run-time translator module 70 does not perform manipulation of the content. It passes the content to the Design-Time Control wrapper module 72 and instructs it to parse the content. Once the content is parsed into an ordered data structure 80 the Design-Time Control wrapper module 72 examines the data and determines what type of Design-Time Control 74 to create. After this is determined, a hidden window 78 is created and the Design-Time Control 74 is created within that window 78. The Design-Time Control wrapper module 72 examines the parsed data and extracts the individual Design-Time Control property values. Using the Component Object Model (COM) interface "IPersistPropertyBag" the Design-Time Control wrapper module 72 sets these property values 82 in the Design-Time Control 74.

Now that the Design-Time Control 74 exists and its property values 82 are synchronized with the current tag data 66 in the document, the user 84 is permitted to interact with and modify the Design-Time Control 74. This modification is done by displaying a properties dialog interface window 76. The inspector 68 instructs the run-time translator module 70 to show the properties dialog interface window 76. The run-time translator module 70 passes this instruction on to the Design-Time Control wrapper module 72. The Design-Time Control wrapper module 72 uses a service of the Windows operating system to display an OLE Property Frame. This is a dialog window that allows the user to view and modify the properties 82 of the Design-Time Control 74. Once the user closes this dialog the Design-Time Control properties 82 have been modified.

The values of the Design-Time Control properties 82 stored inside the Design-Time Control 74 are now different than the tag values 66 stored in the document 60. The final step in this process is for the inspector 68 to replace the MyControl tag content 66 with updated content 82 that reflects these property value changes. The inspector 68 instructs the run-time translator module 70 to get the new content 82. The run-time translator module 70 instructs the Design-Time Control wrapper module 72, in turn. The Design-Time Control wrapper module 72 uses the "Ipersist Property Bag" and "IActiveDesigner" interfaces to store the current values of the Design-Time Control properties 82 and to store the output generated by the Design-Time Control 74. The combined property values and generated output are returned to the inspector 68 as a new block of text-based content. The inspector 68 then replaces the MyControl tag content 66 in the document 60 with the new content received from the Design-Time Control wrapper module 72 via run-time translator module 70.

When a single MyControl tag is inserted, users can perform the cycle of accessing the properties and updating the content as many times as they like. Once a single copy of the Design-Time Control wrapper module and the run-time translator module are installed with one of the Dreamweaver applications, any number of Design-Time Controls can be "plugged in" to the application. For each Design-Time Control that is "plugged in" the present invention provides in this Dreamweaver example that a new tag, new object, and new inspector are added to the Dreamweaver collection of files. A general plug-in process is described in the Extending Dreamweaver 3 document, published by Macromedia, Inc.

In each case, the object and inspectors perform the steps as outlined above. Once a single copy of the Design-Time Control wrapper and run-time translator modules are installed with one of the Dreamweaver applications, any number of Design-Time Controls can be "plugged in" to the application.

The Design-Time Control wrapper module 72 of the present invention may be implemented within a single dynamically linked library (DLL) that has the ability to host a Design-Time Control. The present invention exposes an interface to the user that allows the DLL to be accessible from software applications that do not support Design-Time Controls.

The DLL may include five internal data structures 86. The first data structure is a hash table called the properties map. The properties map is used to store the names and values of the properties for the Design-Time Control that is currently hosted by the invention. Note that each property has a property type which indicates whether the property is a boolean, text, integer, real number, or other type. The second data structure is a string called the metadata tag text. The metadata tag text is the header portion of the text-based representation of the Design-Time Control that is currently hosted by the present invention. The third structure is a string called the control CLSID (class identifier). The control CLSID is the universally unique identifier for the type of Design-Time Control that is currently hosted by the present invention. This identifier is stored in the Windows system registry 88 when a Design-Time Control is installed for the first time on a computer. The fourth structure is a string called the ProgID. The ProgID is the "common" name for the type of Design-Time Control that is currently hosted by the present invention. This name is stored in the Windows system registry 88 when a Design-Time Control is installed on a computer. The fifth structure is a string called Inner HTML. The Inner HTML structure is the complete HTML text-based representation of the Design-Time Control that is currently hosted by the present invention.

It should be understood that some web authoring applications can call the Design-Time Control wrapper module directly. In this case the Design-Time Control wrapper module may be the only piece of software required to accomplish the task of adding Design-Time Control support to an application. However for some applications, the present invention provides for a run-time translator module to bridge the gap between the application's extensibility interface and the Design-Time Control wrapper module. For example, in the case of Microsoft Word, a Word macro is created that calls a non-Visual ActiveX control that calls in turn the Design-Time Control wrapper. In this case, the macro and the intermediate ActiveX control are components of the present invention that are specific to the Microsoft Word application. In such situations, the present invention includes a dialog box that inquires from the user what type of document authoring program the user has. Based upon the information supplied by the user, the present invention installs, if needed, the proper "bridge" (i.e., run-time translator module) on the user's computer.

Figure 3:
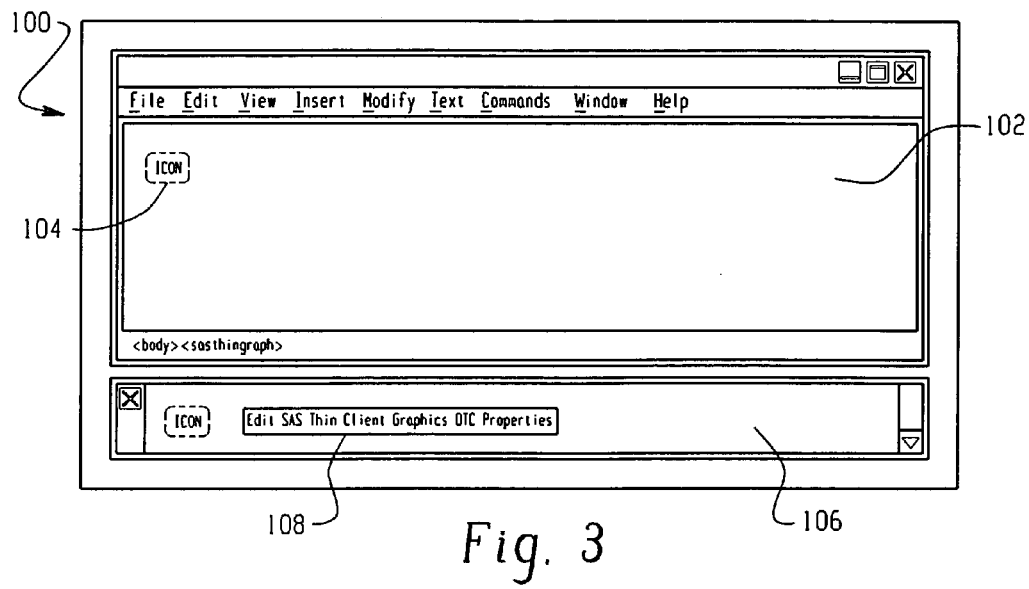
FIG. 3 is a graphical user interface depicting an editing window of a Web page design application.

FIGS. 3–6 exemplify several of the advantages of the present invention in providing an efficient way to edit the properties of Design-Time Controls. FIG. 3 is a graphical user interface 100 that depicts an editing window 102 of a web page design application. In this exemplary graphical user interface 100, a user has inserted a "Thin Client Graphics" Design-Time Control. This Design-Time Control retrieves information from a data source (such as from a database) and displays during run-time the retrieved information with a dynamic graph, such as with a bar graph or x-y graph. A graphical image icon 104 representative of the Design-Time Control appears in the document. Another window 106 provides a button 108 by which the Design-Time Control may be edited.

Figure 4:
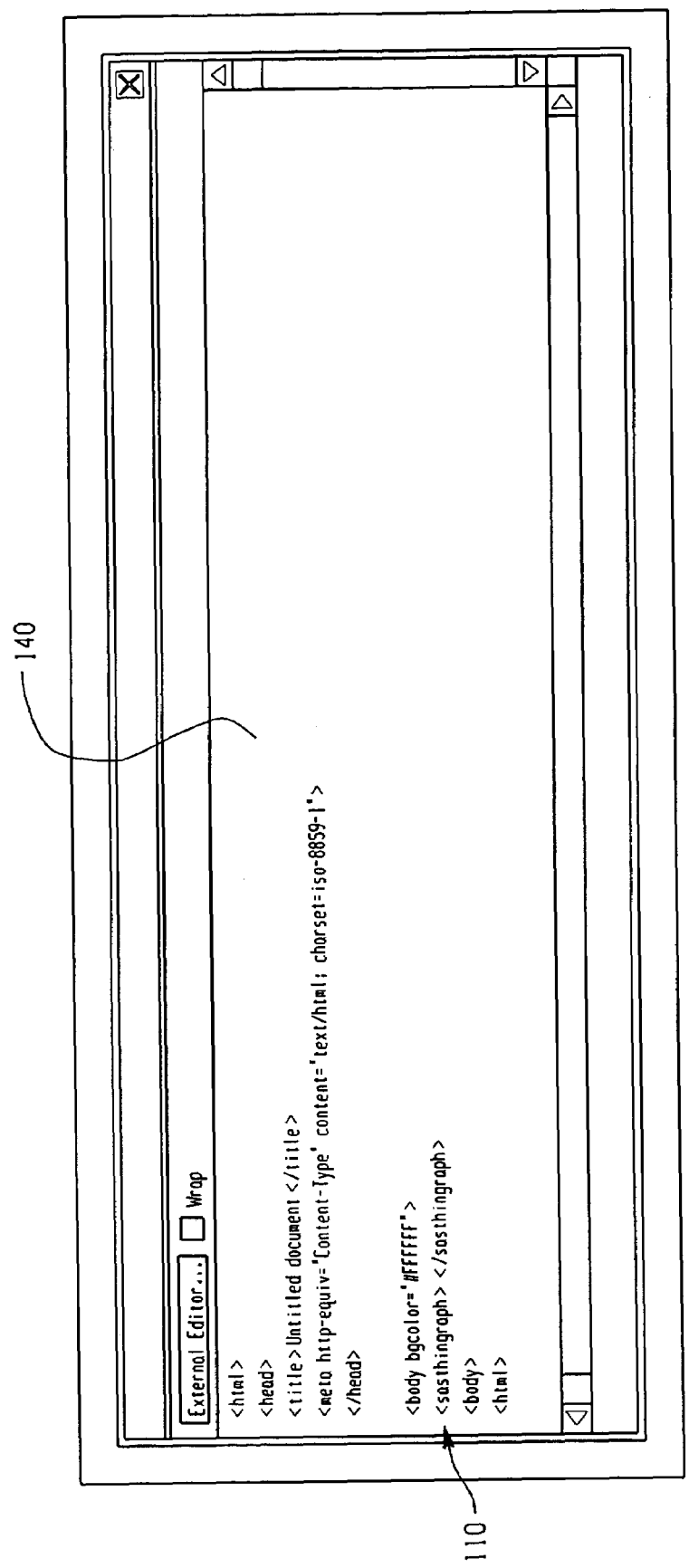
FIG. 4 is a graphical user interface depicting a Design-Time Control as HTML source code.

FIG. 4 depicts the same Design-Time Control as FIG. 3, but with the HTML source code being displayed generally at 110. Since the Design-Time Control has just been inserted, the Design-Time Control does not contain any values and thus contains only the beginning and ending custom tags "<sasthingraph>" and "</sasthingraph>" in the window 140.

Figure 5:
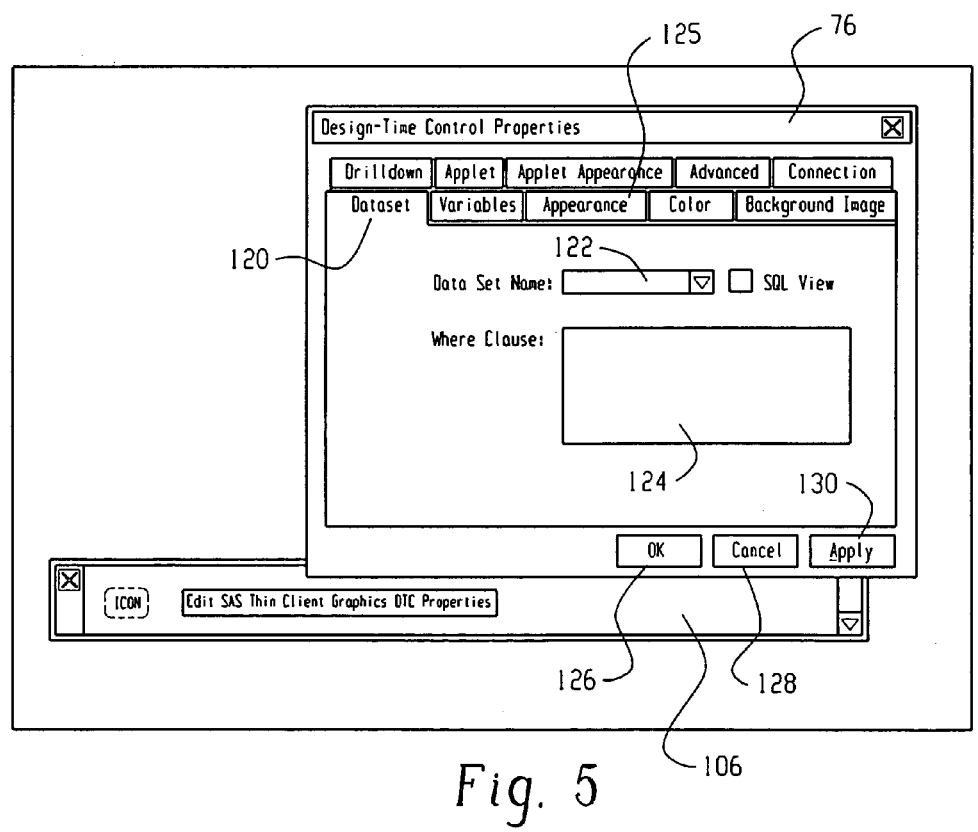
FIG. 5 is a graphical user interface depicting a properties interface window for a Design-Time Control tag.

When a user wishes to edit the properties of the "<sasthingraph>" Design-Time Control, the user selects the edit button 108 of FIG. 3. As shown in FIG. 5, the properties interface 76 then appears. Through the properties interface 76, the user can select different properties of the Design-Time Control to edit. For example, the user can select the Dataset tab 120 on the properties interface 76 to specify in region 122 the source of data for the graph. In the "Where Clause" region 124, the user may also specify filter criteria to retrieve only a certain portion of the data set. Other properties may be edited via the appearance tab 125, such as the size of the graph in the web document.

After the user has finished editing the properties, the user selects either the OK button 126 or the Apply button 130 to provide notification that the changed properties are the desired values for use in the document. The user may also select the Cancel button 128 to leave the properties interface without saving the changed properties. The present invention provides the updated property values to the inspector so that information for the Design-Time Control is updated in the document.

Figure 6:
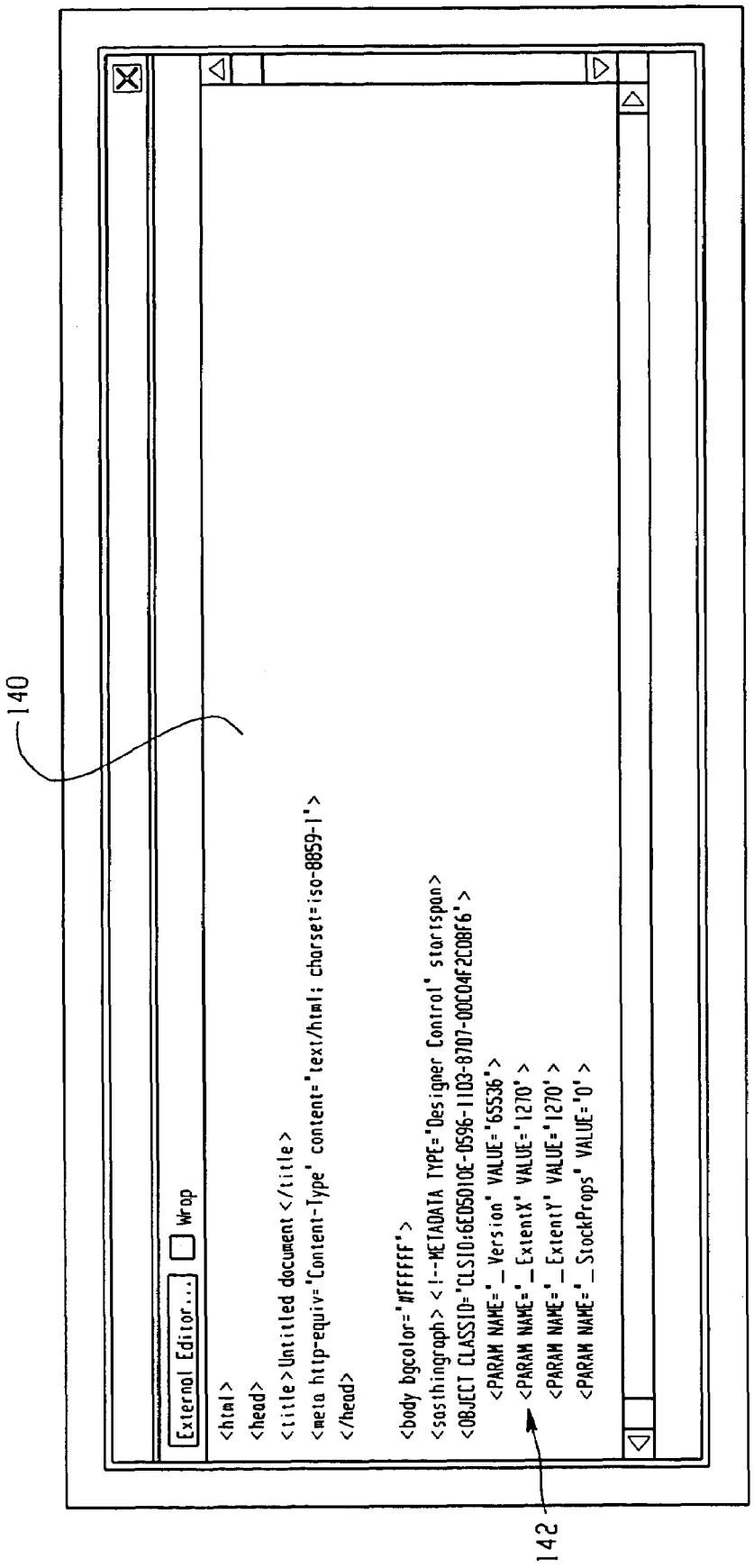
FIG. 6 is a graphical user interface depicting the editing window of a Web page design application with the updated properties information for a Design-Time Control.

FIG. 6 depicts the editing window 140 of a web page development application with the updated property information for the "Thin Client Graphics" Design-Time Control (shown generally at 142). As an updating example, the user may have edited the extent of the geographical region within the web page for the graph to be "1270" in the X direction and "1270" in the Y direction. The value of "1270" is in the default unit of measurement in Visual Basic of twips wherein "1440" twips equals one inch. When a client is viewing the web page at run-time, the graph has a geographical extent as specified by the properties "_ExtentX" and "_ExtentY".

Figure 7A:
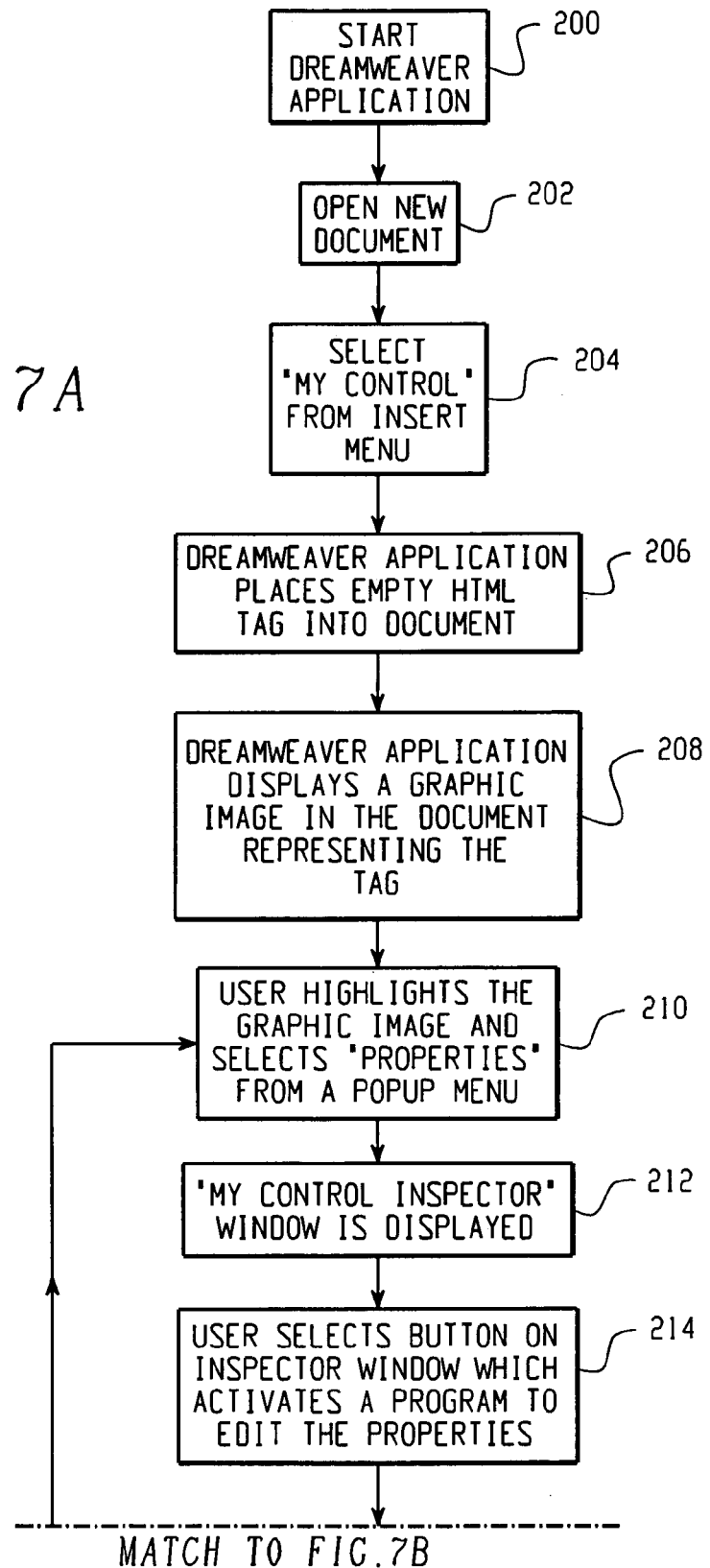
FIGS. 7A–7B are system-level flow charts depicting exemplary steps for operating the present invention to modify properties of Design-Time Controls.
Figure 7B:
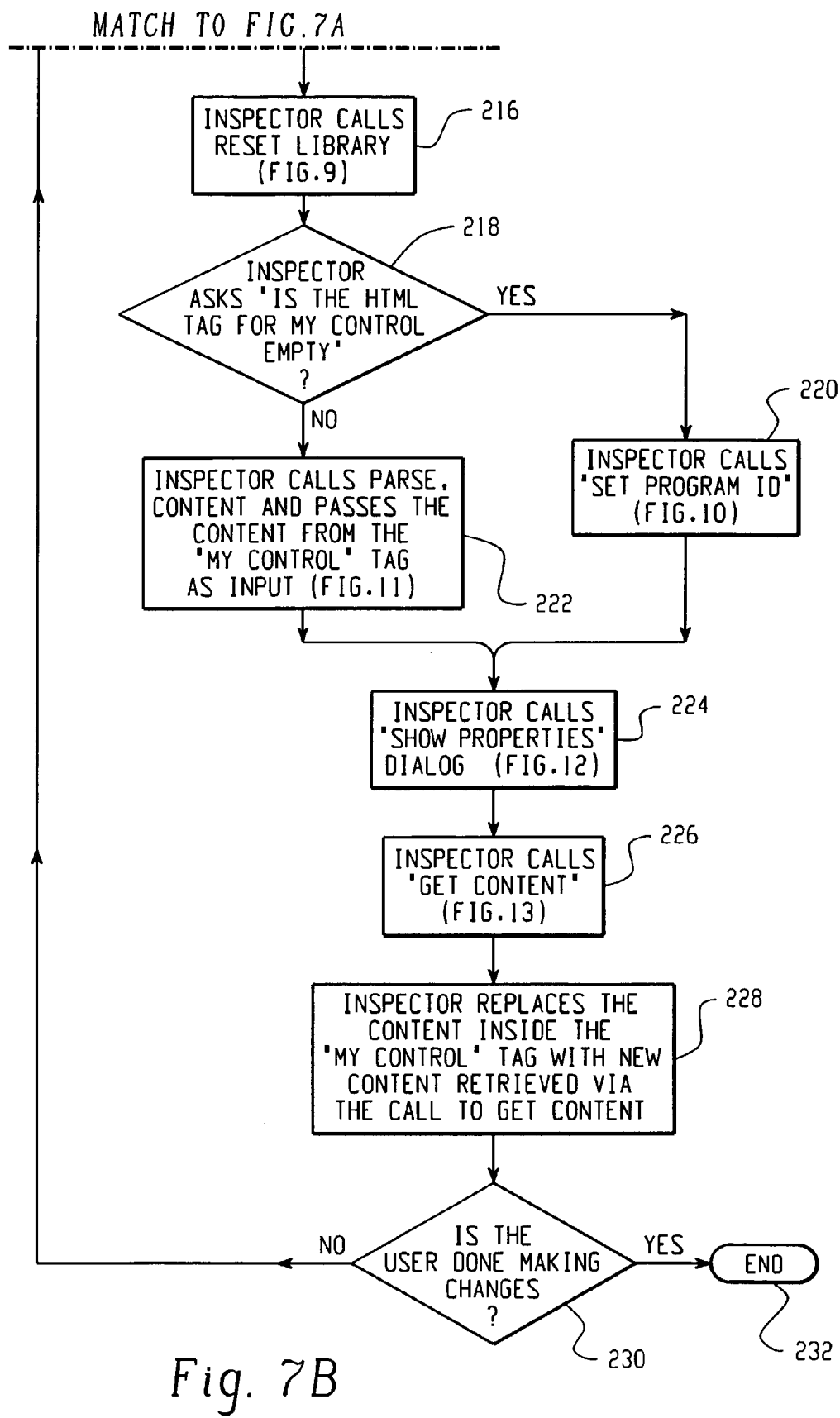

FIGS. 7A and 7B depict exemplary steps for operating the present invention to efficiently edit properties of Design-Time Controls. At step 200 of FIG. 7A, the web page design application is started. A web page document is opened at step 202 and a custom control is inserted via the insert menu of the development application at step 204. The development application places empty HTML tags into the document at step 206.

Step 208 allows a graphic image, usually in the form of an icon, to be inserted into the document. The graphic image is representative of the custom tag. The user highlights the graphic image and selects the "properties" item from the popup menu at step 210. At step 212, the MyControl inspector window is displayed, and within that window at step 214 the user selects the button which activates the program to edit the control's properties.

Figure 9:
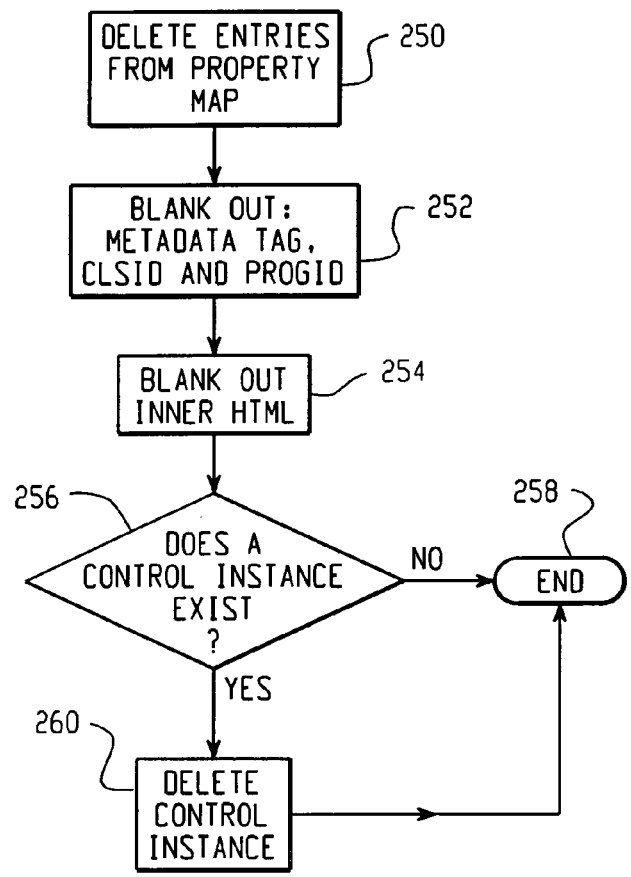
FIG. 9 is a flow chart depicting steps for resetting the dynamically linked library.

With reference to FIG. 7B, the inspector calls at step 216 the reset library (which is further described in FIG. 9). Decision step 218 examines whether the HTML tag in the document is empty of any property values. If it is, then at step 220 the inspector calls the set ProgID function which is used by the present invention to know what type of Design-Time Control is to be used (note: step 220 is further described in FIG. 10). If decision step 218 determines that the HTML tag contains property values, then step 222 is invoked wherein the inspector calls a parse content function in order to pass the content from the MyControl tag to the present invention (note: step 222 is further described in FIG. 11). Processing continues at step 224 after either steps 220 or 222 have completed.

Figure 12:
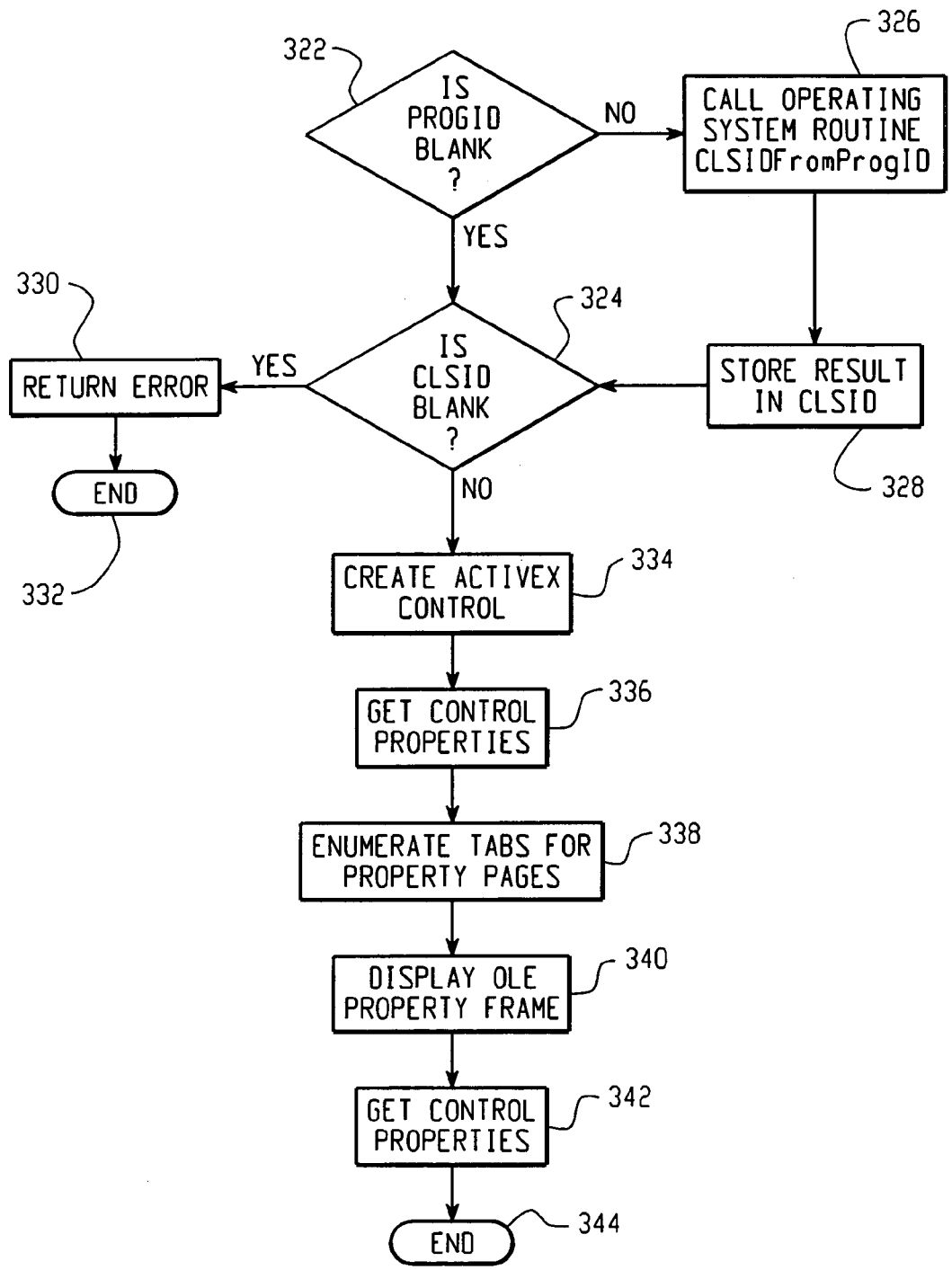
FIG. 12 is a flow chart depicting steps for displaying the properties dialog box for a Design-Time Control.

At step 224, the inspector calls the show properties dialog (note: step 224 is further described in FIG. 12). The inspector calls the get content function at step 226 which is further described in FIG. 13. At step 228, the inspector replaces the content inside the MyControl tag with new content retrieved via the call to get content. If the user is done making changes as determined at decision block 230, then processing terminates at end block 232. If the user has additional changes, then processing continues at step 210 on FIG. 7A wherein the user highlights the graphic image and selects the appropriate menu item to edit the properties of the control.

Figure 8:
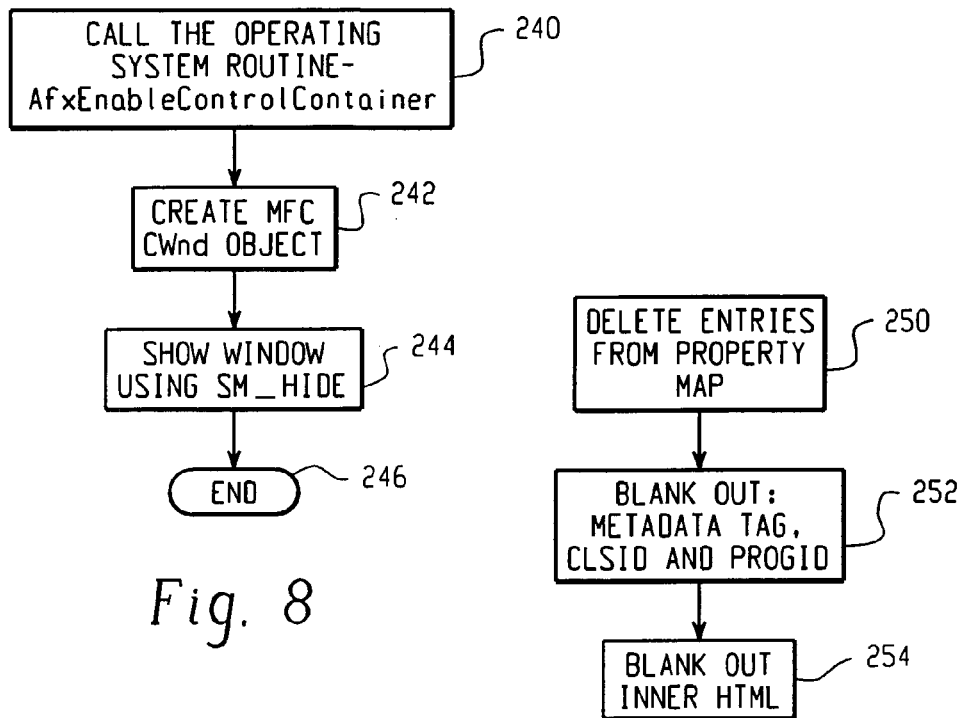
FIG. 8 is a flow chart depicting steps for loading the dynamically linked library of the present invention into system memory.

FIGS. 8–14 more specifically describe the functionality of the present invention. FIG. 8 is a flow chart depicting steps that may be used to load the dynamically linked library of the present invention into system memory. This function is invoked once a software application causes the DLL to be loaded into system memory. First at step 240, the operating system routine "AfxEnableControlContainer" is called to declare that the Design-Time Control wrapper library is going to be a container for ActiveX controls. Then at step 242, an MFC CWnd object is created and displayed at step 244 using the SW_HIDE attribute in order to create a hidden window. This window will be used later to create a control instance. This function then terminates at end block 246.

FIG. 9 is a flow chart showing steps that may be used to reset the dynamically linked library. First at step 250, all entries are deleted from the property map internal data structure. Next at step 252, all entries are deleted from the metadata tag text, control CLSID and control ProgID internal data structures. At step 254, the entries of the inner HTML structure are deleted. Decision block 256 examines if a control instance exists. If it does not then processing terminates at end block 258. If it does contain a control instance, then it is destroyed at step 260 and the function terminates at end block 258.

Figure 10:
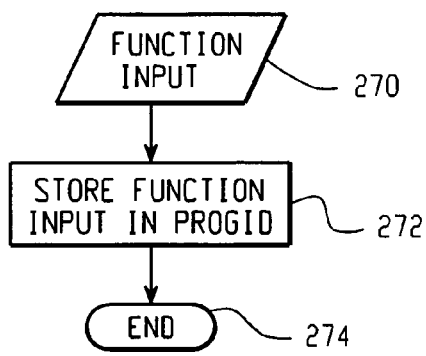
FIG. 10 is a flow chart depicting steps for setting the ProgID of a Design-Time Control.

FIG. 10 is a flow chart showing steps that may be used to set the ProgID of a Design-Time Control. This function accepts a single text string argument at step 270 and returns success or failure. The text value passed into this function from the software application is stored in the ProgID internal data structure at step 272. The function then terminates at end block 274.

Figure 11:
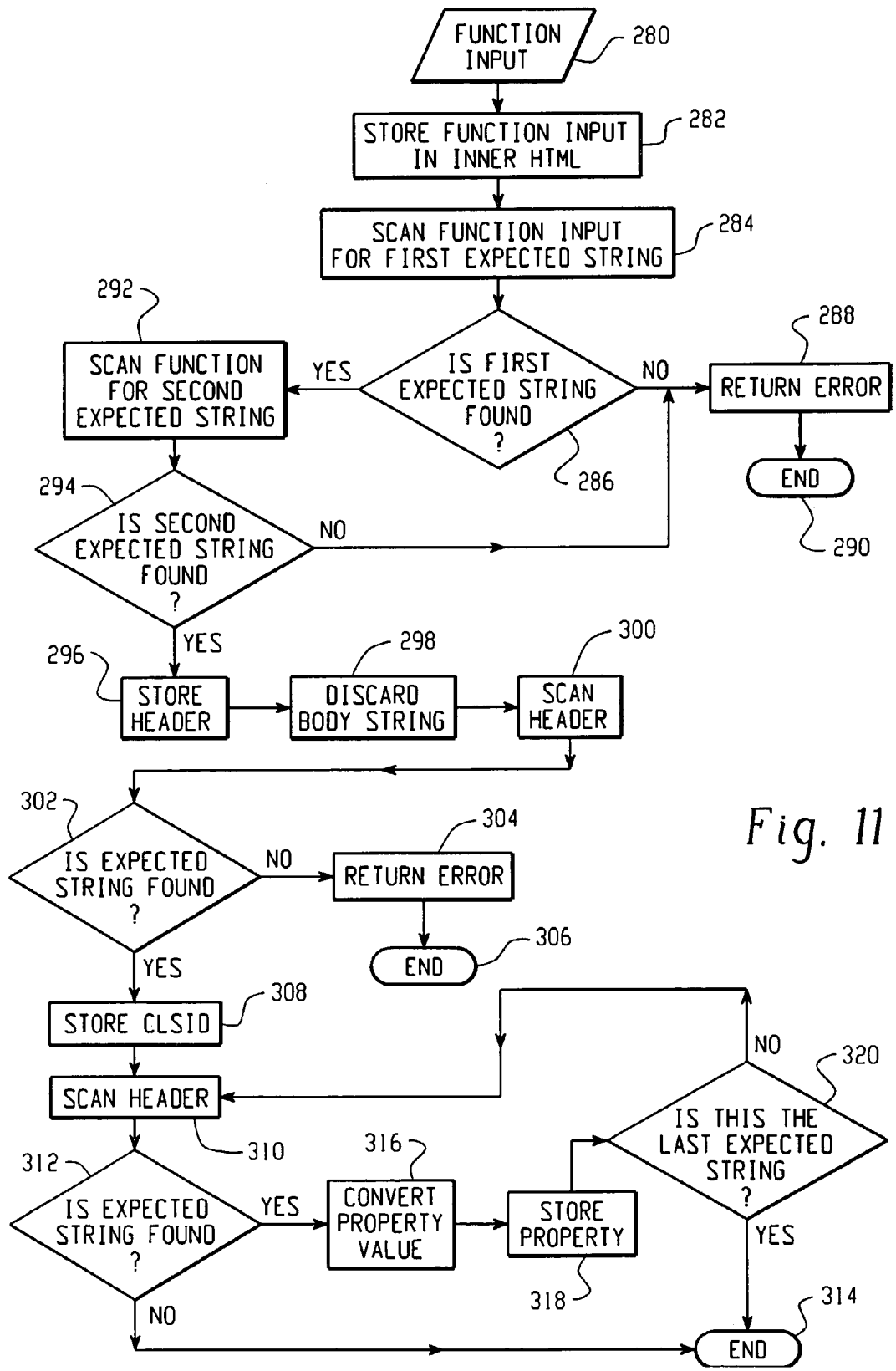
FIG. 11 is a flow chart depicting steps for parsing the digital content that corresponds to a Design-Time Control.

FIG. 11 is a flow chart showing steps that may be used to parse the digital content that corresponds to a Design-Time Control. This function accepts at step 280 a single text string argument and returns success or failure. First at step 282, the input text string passed in is stored in the Inner HTML internal data structure. Next at step 284, the input text string is scanned and broken up into two strings, the header string and the body string. Two expected strings delimit the header string. The first expected string begins with an HTML comment such as:

<!--METADATA TYPE="DesignerControl" startspan

If the first expected string is not found at decision block 286, then the function returns an error message at step 288 and terminates at end block 290. If, however, the first expected string is found at decision block 286, the function continues to scan at step 292 for a second expected string such as:

-->

If the second expected string is not found at decision block 294, then the function returns an error message at step 288 and terminates at end block 290. If, however, the second expected string is found at decision block 294, the function stores the header in the Metadata tag text internal data structure at step 296. The body string, which begins just after the close of the initial comment tag, is discarded at step 298.

Next, the header string is scanned at step 300 for a string such as:

CLASSID="CLSID:####"

where #### is a string of 36 characters long. If the string is not found at decision block 302, then the function returns an error message at step 304 and terminates at end block 306.

If the string is found at decision block 302, the text in the location of #### is stored as the Control CLSID internal data structure during step 308.

The header string is scanned at step 310 for multiple strings such as:

<PARAM NAME="nnnn" VALUE="vvvv"> where nnnn and vvvv are strings of arbitrary length. If the strings are not found at decision block 312, then processing terminates at end block 314. If the strings are found at decision block 312, then these names and values are stored as hash elements in the property map internal data structure at step 318. If a value contains the special string:

&quot;

it is translated into a double quote character at step 316 before being stored at block 318. If this is the last string as determined by decision block 320, the function terminates at end block 314. If it is not the last string, control loops back and the header string is scanned for more name/value pair strings at step 310.

FIG. 12 is a flow chart showing steps that may be used to display the properties dialog box for a Design-Time Control. The function tests at decision block 322 whether the ProgID internal data structure is blank. If it is blank, processing continues at decision block 324. If it is not blank, the function calls the Windows operating system routine CLSIDFromProgID at step 326 and stores the result in CLSID at step 328. Next, the function tests whether CLSID is blank at decision block 324. If the CLSID is blank, the function returns an error at step 330 and terminates at end block 332.

If the CLSID is not blank as determined by decision block 324, then at step 334 a control is created in the CWnd object (that was created by the InitInstance function of FIG. 8) by calling CreateControl and passing the CLSID value from the internal data structure. This returns a handle to a control instance.

At step 336, the IPersistPropertyBag COM (Component Object Model from Microsoft Corporation) interface is used to take the values from the property map internal data structure and set them in the control instance. At step 338, the ISpecifyPropertyPages interface is used to enumerate the tabs that will appear on the property pages for the control instance. At step 340, the Windows API function OleCreatePropertyFrame is called. A handle to the control instance and the property page enumeration are passed to this function so that the correct property page tabs are created and connected to the control instance. The OleCreatePropertyFrame allows the interactive user to modify control properties. The function does not return until the interactive user closes the property frame window. When the property frame is closed all entries are removed from the property map internal data structure. The IPersistPropertyBag interface is used to retrieve the current property settings stored in the control instance at step 342. These values are stored in the property map internal data structure. Processing then terminates at end block 344.

Figure 13:
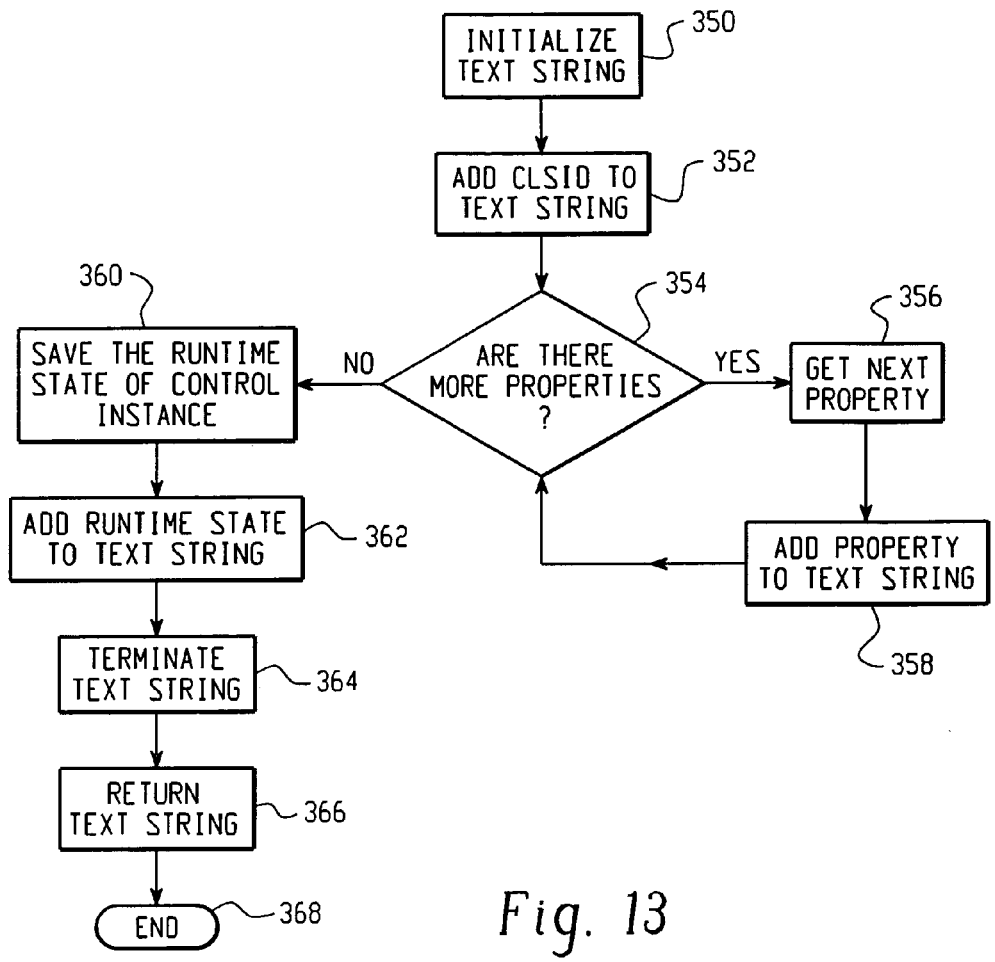
FIG. 13 is a flow chart depicting steps for getting the digital document content that corresponds to a Design-Time Control from the dynamically linked library.

FIG. 13 is a flow chart showing steps that may be used to obtain the digital document content that corresponds to a Design-Time Control from the dynamically linked library. The function returns a text string. First, a text string is composed at step 350 starting with an HTML comment such as:

<!--METADATA TYPE="DesignerControl" startspan

Next, a text string is added at step 352 such as:

CLASSID="CLSID:####"

The value of the CLSID from the internal data structure is written in place of #### in this string.

Next, the property map internal data structure is examined at decision block 354. If the properties map is not empty, then each element in the map is obtained at step 356 and written at step 358 as a name/value pair text string of the form:

<PARAM NAME="nnnn" VALUE="vvvv">

The name from the property map is written in place of nnnn and the value is written in place of vvvv. Finally, the text string --> is added to close the HTML comment.

When there are no more properties as determined by decision block 354, then at step 360 the IActiveDesigner interface is used to query the control for its generated content. Specifically, the SaveRuntimeState method is called and the returned text is appended at step 362 to the text string composed in the preceding steps of FIG. 13. At step 364, the HTML comment:

<!--METADATA TYPE="DesignerControl" endspan--> is added to the text string to terminate the text string. The complete text string is returned at step 366, and the function ends at end block 368.

Figure 14:
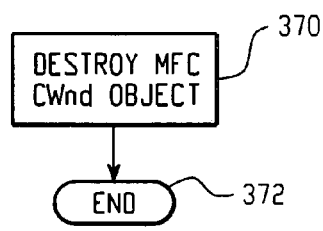
FIG. 14 is a flow chart depicting steps for releasing the system resources allocated by the dynamically linked library during its use.

FIG. 14 is a flow chart showing steps that may be used to release the system resources allocated by the dynamically linked library during its use. The CWnd window object that was created in the InitInstance routine is destroyed at step 370. This function terminates at end block 372.

The preferred embodiments described herein are presented only to demonstrate an example of the invention. Additional, and/or alternative, embodiments of the invention would be apparent to one of ordinary skill in the art upon reading this disclosure.

It is claimed:

1. A computer-implemented method that authors information stored in a document, wherein a client computer processes the information at run-time, comprising the steps of:
    receiving information about a first control that has both property types and property values that define how the first control appears in the document;
    wherein a software application contains the first control and whose application's extensibility interfaces do not natively support a design-time control;
    creating a second control as a design-time control whose property types substantially match the property types of the first control;
    wherein the second control is created by:
        (i) receiving at least a portion of the run-time information of the first control;
        (ii) parsing the run-time information in order to determine the property values of the first control;
        (iii) determining type of design-time control to create as the second control based upon the determined property values;
    generating an interface for modifying by the user of the property values of the second control; and
    using the second control's modified property values to update the property values of the first control in the document by converting the second control's modified property values into run-time information to be used within the document.

2. The method of claim 1 wherein the design-time information is used during authoring of the information.

3. The method of claim 1 further comprising the steps of:
providing a data communication connection to the software application through at least one of the extensibility interfaces;
receiving information about the first control through the data communication connection; and
sending the second control's modified property values to the software application through the data communication connection in order to update the property values of the first control in the document.

4. The method of claim 1 wherein a graphic image represents the first control in the document.

5. The method of claim 4 further comprising the step of:
receiving information about the first control after the graphic image of the first control has been activated by a user in order to edit the property values of the first control.

6. The method of claim 1 further comprising the step of:
receiving an identifier to indicate type of design time control to create as the second control, wherein the identifier is received when the property values of the first control are empty.

7. The method of claim 6 wherein the identifier is retrieved from an operating system registry.

8. The method of claim 1 further comprising the steps of:
receiving the property values of the first control, wherein at least one of the property values is not empty; and
determining type of design time control to create as the second control based upon the property values.

9. The method of claim 1 wherein the first control is a tag that is inserted into the document; wherein the run-time information includes Hypertext Markup Language (HTML) run-time instructions.

10. The method of claim 1 wherein the run-time information includes Hypertext Markup Language (HTML) run-time instructions, said method further comprising the steps of:
receiving the HTML run-time instructions of the first control;
parsing the HTML run-time instructions to obtain a properties map, metadata tag text, a control class identifier, a program identifier, and inner HTML information; and
determining type of design time control to create as the second control based upon the parsed HTML run-time instructions.

11. The method of claim 1 further comprising the step of:
creating a hidden window to store the second control.

12. The method of claim 1 further comprising the step of:
generating a computer-human interface for modifying the property values of the second control.

13. The method of claim 12 wherein the run-time information includes Hypertext Markup Language (HTML) run-time instructions, said method further comprising the steps of:
receiving the HTML run-time instructions of the first control;
parsing the HTML run-time instructions to obtain a properties map, metadata tag text, a control class identifier, a program identifier, and inner HTML information;
determining type of design time control to create as the second control based upon the parsed HTML run-time instructions; and
determining what properties to display in the computer-human interface based upon the parsed HTML run-time instructions.

14. The method of claim 1 further comprising the step of:
converting the second control's modified property values into Hypertext Markup Language (HTML) run-time instructions to be used within the document.

15. The method of claim 1 wherein the client computer receives the document over a network in order to processes the information.

16. The method of claim 15 wherein the network is selected from the group consisting of local area networks, wide area networks, global networks, and combinations thereof.

17. The method of claim 1 wherein the document is an Hypertext Markup Language (HTML) document.

18. A computer-implemented apparatus that authors information stored in a document, wherein a client computer processes the information at run-time, comprising:
a design time control wrapper module that receives information about a first control, wherein the first control has both property types and property values that define how the first control appears in the document;
wherein a software application contains the first control and whose application's extensibility interfaces do not natively support a design-time control;
a window connected to the design time control wrapper within which a second control is created, wherein the second control's property types substantially match the property types of the first control; and
wherein the second control is created by:
(i) receiving at least a portion of the run-time information of the first control;
(ii) parsing the run-time information in order to determine the property values of the first control;
(iii) determining type of design-time control to create as the second control based upon the determined property values;
a properties interface connected to the window to modify the property values of the second control,
whereby the second control's modified property values are used to update the property values of the first control in the document by converting the second control's modified property values into run-time information to be used within the document.

19. The apparatus of claim 18 wherein the design-time information is used during authoring of the information.

20. The apparatus of claim 18 further comprising:
a run-time translator module connected to the design time control wrapper module, wherein the run-time translator includes a data communication connection to the software application through at least one of the extensibility interfaces,
wherein the run-time translator module receives information about the first control in order to provide the information to the design time control wrapper module.

21. The apparatus of claim 18 wherein a graphic image represents the first control in the document.

22. The apparatus of claim 18 wherein the design time control wrapper module receives an identifier to indicate type of design time control to create as the second control, wherein the identifier is received when the property values of the first control are empty.

23. The apparatus of claim 22 wherein the identifier is from an operating system registry.

24. The apparatus of claim 18 wherein the design time control wrapper module receives property values of the first control, wherein at least one of the property values is not empty, wherein the design time control wrapper module determines type of design time control to create as the second control based upon the received property values.

25. The apparatus of claim 18 wherein the design time control wrapper module parses the run-time information of the first control in order to determine the property values of the first control, said apparatus further comprising:
a properties data structure to store the property values, wherein type of design time control to create as the second control is based upon the stored property values.

26. The apparatus of claim 25 wherein the run-time information includes Hypertext Markup Language (HTML) run-time instructions.

27. The apparatus of claim 26 further comprising:
a properties map data structure connected to the design time control wrapper module to store names and values of the properties parsed from the HTML run-time instructions,
wherein the interface includes the property names and values stored in the properties map data structure.

28. The apparatus of claim 26 further comprising:
a metadata tag text data structure connected to the design time control wrapper module to store a header portion contained in the HTML run-time instructions.

29. The apparatus of claim 26 further comprising:
a control class identification data structure connected to the design time control wrapper module to store a control classification identifier contained in the HTML run-time instructions.

30. The apparatus of claim 26 further comprising:
a program identifier data structure connected to the design time control wrapper module to store a program identifier contained in the HTML run-time instructions,
wherein the stored program identifier is used to determine what type of design time control to create within the window.

31. The apparatus of claim 26 further comprising:
an inner HTML data structure connected to the design time control wrapper module to store substantially a complete HTML text representation of the first control.

32. The apparatus of claim 18 wherein the window is a hidden window to store the second control.

33. The apparatus of claim 18 wherein the properties interface is a computer-human interface that modifies the property values of the second control.

34. The apparatus of claim 33 wherein the run-time information includes Hypertext Markup Language (HTML) run-time instructions, said apparatus further comprising:
means for receiving the HTML run-time instructions of the first control;
means for parsing the HTML run-time instructions to obtain a properties map, metadata tag text, a control class identifier, a program identifier, and inner HTML information;
means for determining type of design time control to create as the second control based upon the parsed HTML run-time instructions; and
means for determining what properties to display in the computer-human interface based upon the parsed HTML run-time instructions.

35. The apparatus of claim 18 further comprising:
means for converting the second control's modified property values into run-time information to be used within the document.

36. The apparatus of claim 18 further comprising:
means for converting the second control's modified property values into Hypertext Markup Language (HTML) run-time instructions to be used within the document.

37. The apparatus of claim 18 wherein the client computer receives the document over a network in order to processes the information.

38. The apparatus of claim 37 wherein the network is selected from the group consisting of local area networks, wide area networks, global networks, and combinations thereof.

39. The apparatus of claim 18 wherein the document is an Hypertext Markup Language (HTML) document.

40. The apparatus of claim 18 wherein the design time control wrapper module handles a plurality of different types of design time control that are used within the document.

41. A computer-implemented method that authors information stored in a document, wherein a client computer processes the information at run-time, comprising the steps of:
receiving information about a first control that has both property types and property values that define how the first control appears in the document;
wherein the first control includes run-time information, wherein the runtime information is processed at run-time;
wherein a software application contains the first control which is a first type of control, wherein the software application's extensibility interfaces do not natively support a second type of control;
creating a second control whose property types substantially match the property types of the first control;
wherein type of the second control is the second control type:
wherein the second control generates both design-tine information and rum-time information, wherein the run-time information is processed at run-time, wherein the design-time information is not used during run-time;
wherein the second control is created by:
(i) receiving at least a portion of the run-time information of the first control;
(ii) parsing the run-time information in order to determine the property values of the first control;
(iii) determining which second type of control to create as the second control based upon the determined property values;
generating an interface for modifying by the user of the property values of the second control; and
using the second control's modified property values to update the property values of the first control in the document by converting the second control's modified property values into run-time information to be used within the document.

* * * * *

UNITED STATES PATENT AND TRADEMARK OFFICE
CERTIFICATE OF CORRECTION

PATENT NO. : 6,948,120 B1
DATED : September 20, 2005
INVENTOR(S) : DelGobbo et al.

It is certified that error appears in the above-identified patent and that said Letters Patent is hereby corrected as shown below:

Column 14,
Line 39, delete "type:" and insert -- type; --.
Line 40, delete "design-tine" and insert -- design-time --.
Line 41, delete "rum-time" and insert -- run-time --.
Line 53, delete "of".

Signed and Sealed this

Eighth Day of November, 2005

JON W. DUDAS
*Director of the United States Patent and Trademark Office*